United States Patent
Chua et al.

(10) Patent No.: US 6,838,806 B2
(45) Date of Patent: Jan. 4, 2005

(54) VIBRATORY IN-PLANE TUNNELING GYROSCOPE

(75) Inventors: Bee Lee Chua, Singapore (SG); Holden King Ho Li, Singapore (SG); Yuan Xu, Singapore (SG); Francis Eng Hock Tay, Singapore (SG); William Tze-You Chen, Singapore (SG)

(73) Assignees: Agency for Science, Technology and Research, Centros (SG); National University of Singapore, Crescent (SG)

( * ) Notice: Subject to any disclaimer, the term of this patent is extended or adjusted under 35 U.S.C. 154(b) by 111 days.

(21) Appl. No.: 10/038,530

(22) Filed: Jan. 2, 2002

(65) Prior Publication Data

US 2002/0167248 A1 Nov. 14, 2002

(30) Foreign Application Priority Data

Jan. 3, 2001 (SG) .......................................... 200100229

(51) Int. Cl.[7] .............................................. H02N 1/00
(52) U.S. Cl. ......................................................... 310/309
(58) Field of Search ................................. 310/309, 328, 310/370, 311; 73/504.16, 504.15, 504.02, 504.03, 504.12, 862; H02N 1/00

(56) References Cited

U.S. PATENT DOCUMENTS

| | | | | | |
|---|---|---|---|---|---|
| 4,930,351 | A | * | 6/1990 | Macy et al. | 73/504.04 |
| 5,349,855 | A | * | 9/1994 | Bernstein et al. | 73/504.16 |
| 5,481,914 | A | * | 1/1996 | Ward | 73/504.16 |
| 5,600,064 | A | * | 2/1997 | Ward | 73/504.04 |
| 5,672,949 | A | * | 9/1997 | Ward | 318/609 |
| 5,703,292 | A | * | 12/1997 | Ward | 73/504.02 |
| 5,767,405 | A | * | 6/1998 | Bernstein et al. | 73/504.16 |
| 5,767,961 | A | * | 6/1998 | Nishikawa et al. | 356/237.1 |
| 5,892,153 | A | * | 4/1999 | Weinberg et al. | 73/504.16 |
| 5,911,156 | A | * | 6/1999 | Ward et al. | 73/504.16 |
| 5,952,574 | A | * | 9/1999 | Weinberg et al. | 73/504.16 |

OTHER PUBLICATIONS

New Designs of Micromachined Vibrating Rate Gyrosopes withs Decoupled Oscillation Modes Apr. 1997 p. 1129–1132.*
New Designs of Micromachined Vibrating Rate Gyrosopes withs Decoupled Oscillation Modes Apr. 1997 p. 1129–1132.*

* cited by examiner

*Primary Examiner*—Thomas M. Dougherty
*Assistant Examiner*—Karen Beth Addison
(74) *Attorney, Agent, or Firm*—Ladas & Parry (57) ABSTRACT

A gyroscope comprising: a proof mass; a frame supporting the proof mass; a connection arrangement connecting the proof mass and the frame, the connection arrangement having a first stiffness in a first direction and a second stiffness in a second direction substantially perpendicular to the first direction, one of the stiffness being significantly greater than the other stiffness; and a pair of elements adapted to sense relatively motion therebetween in either the first or the second direction. Also disclosed is a gyroscope comprising: a proof mass; a frame supporting the proof mass and connected to only one edge thereof by a connection arrangement extending between the proof mass and the frame in a first direction, the connection arrangement having a first stiffness in the first direction and a second stiffness in a second direction substantially perpendicular to the first direction, the first stiffness being significantly greater than the second stiffness; and a pair of elements adapted to sense relative motion therebetween in the first direction.

41 Claims, 10 Drawing Sheets

VIBRATORY IN-PLANE TUNNELING GYROSCOPE

The phenomenon of quantum tunnelling is extremely useful in the measurement of very small displacements between objects, sub-nanometer resolution being readily achievable. This high accuracy is due to the exponential relationship between the tunnelling current flowing between two electrodes and the displacement therebetween, variations in the tunnelling current arising from extremely small variations in displacement being detectable. However, if the electrodes are more than a few nanometers apart, the tunnelling phenomenon will not be observed.

Vibratory gyroscopes generally comprise a proof mass driven to perform linear oscillations in a first direction, in order to measure the rate of rotation of the proof mass around a rotation axis that is perpendicular to the first direction. Due to the Coriolis effect, a force is exerted on the proof mass during the oscillation thereof in a direction that is perpendicular to both the first direction and the axis of rotation. It is this slight deflection in the trajectory of the proof mass that is sensed, to provide a measurement of the rate of rotation of the gyroscope around the rotation axis.

Difficulties have been encountered in applying the benefits of the exploitation of quantum tunnelling techniques to the above type of gyroscope. This is due to the fact that a tunnelling tip of quantum tunnelling gyroscope must be positioned very close to the surface of the oscillating proof mass (in the to be observed. However, since the surface of the proof mass is generally uneven, having a root mean square (RMS) unevenness of the order of a few tens of nanometers (it being extremely difficult to remove imperfections on a side surface of the proof mass to below this limit), the movement of the surface of the proof mass past the tunnelling tip during oscillation of the proof mass renders the measurement of the deflection of the proof mass in the sensing direction extremely difficult.

The unevenness of the surface of the proof mass in the direction normal to the tunnelling tip will either cause the tunnelling tip to collide with the surface of the proof mass, resulting in damage thereto, or will cause the distance between the tunnelling tip and the surface of the proof mass to become too great during portions of the movement of the proof mass for the distance between the tunnelling tip and the proof mass to be measured, as the tunnelling current will fall to zero.

A further disadvantage of vibratory in-plane gyroscopes is that such a gyroscope is sensitive to disturbances, such as linear accelerations in the sensing direction, and is unable to distinguish between deflection of the trajectory of the proof mass due to the Coriolis effect and deflection due to extraneous movement of the entire gyroscope.

It is an object of the present invention to seek to alleviate some or all of the above disadvantages.

Accordingly, one aspect of the present invention provides a gyroscope comprising a pair of constituent gyroscopes, each of the constituent gyroscopes comprising: a proof mass; a frame supporting the proof mass; a connection arrangement connecting the proof mass and the frame, the connection arrangement having a first stiffness in a first direction and a second stiffness in the second direction substantially perpendicular to the first direction, one of the stiffnesses being significantly greater than the other stiffness; and a pair of elements, one of which is a quantum tunnelling sensing tip, adapted to sense motion therebetween in either the first or the second direction.

Advantageously, means are provided on each of the constituent gyroscopes to cause the respective proof masses to oscillate in either the first or the second direction, the pairs of elements being adapted to sense motion in the other of the first or the second direction.

Preferably, the means to cause the respective proof masses to oscillate are operable to cause the respective proof masses to oscillate in antiphase with one another.

Conveniently, at least one of the means to cause the proof masses to oscillate comprises at least one electrostatic oscillation actuator.

Advantageously, at least one of the means to cause the proof masses to oscillate comprises at least one current-carrying element orientated in the other of the first or the second direction, a magnetic field being provided in a direction perpendicular to the first and second directions.

Preferably, at least one of the connection arrangements comprises at least one suspension beam extending between the proof mass and the frame.

Conveniently, at least one of the constituent gyroscopes comprises an anchor, the frame of the constituent gyroscope being connected to the anchor.

Advantageously, the gyroscope further comprises a positioner located adjacent the frame of the at least one constituent gyroscope, the positioner being connected to the anchor.

Preferably, the positioner is connected to the anchor by at least one spring.

Conveniently, the gyroscope further comprises means to vary the distance between the positioner and the frame.

Advantageously, the means to vary the distance between the positioner and the frame comprise at least one electrostatic positioning actuator.

Preferably, the means to vary the distance between the positioner and the frame comprise at least one current-carrying element.

Conveniently, one of at least one of the pairs of elements is located on the frame of the respective constituent gyroscope, the other of the at least one of the pairs of elements being located on the proof mass of the respective constituent gyroscope.

Advantageously, one of the pair of elements on the at least one constituent gyroscope is located on the positioner, the other of the pair of elements being located on the frame of the at least one constituent gyroscope.

Preferably, at least one of the constituent gyroscopes comprises a further proof mass.

Conveniently, the at least one constituent gyroscope comprising a further proof mass further comprises a strut passing between the proof mass and the further proof mass of the respective constituent gyroscope.

Advantageously, the sensed relative motion between each of the pairs of elements is used to maintain a predetermined distance between the elements of each pair of elements.

Preferably, the respective pairs of elements are adapted to sense motion in collinear directions.

Another aspect of the present invention provides a gyroscope comprising: a proof mass; a frame supporting the proof mass and connected to only one edge thereof by a connection arrangement extending between the proof mass and the frame in a first direction, the connection arrangement having a first stiffness in the first direction and a second stiffness in a second direction substantially perpendicular to the first direction, the first stiffness being significantly greater than the second stiffness; and a pair of elements adapted to sense relative motion therebetween in the first direction.

Conveniently, the gyroscope further comprises means to cause the proof mass to oscillate in the second direction.

Advantageously, the means to cause the proof mass to oscillate comprise at least one electrostatic oscillation actuator.

Preferably, the means to cause the proof mass to oscillate comprise at least one current carrying element oriented in the first direction.

Conveniently, the frame and the proof mass are connected to one another by the connection arrangement such that, during oscillation of the proof mass in the second direction, the proof mass suffers an angular deflection with respect to the frame.

Advantageously, the proof mass suffers the angular deflection as a result of a cantilever effect.

Preferably, one of the pair of elements comprises a quantum tunnelling sensing tip, the other of the pair of elements comprising an electrode.

Conveniently, the gyroscope further comprises a positioner located adjacent the frame.

Advantageously, the gyroscope further comprises an anchor, the positioner and the frame being connected to the anchor.

Preferably, the positioner is connected to the anchor by at least one spring.

Conveniently, means are provided to vary the distance between the positioner and the frame.

Advantageously, the means to vary the distance between the positioner and the frame comprise at least one electrostatic positioning actuator.

Preferably, the means to vary the distance between the positioner and the frame comprise at least one current-carrying element oriented in the second direction, a magnetic field being provided in a direction perpendicular to the first and second directions.

Conveniently, one of the pairs of elements is located on the positioner, the other of the pair of elements being located on the frame.

Advantageously, one of the pair of elements is located on the frame, the other of the pair of elements being located on the proof mass.

Preferably, further comprising an anchor, the frame being connected to the anchor.

Conveniently, the frame is connected to the anchor at only one end thereof.

Advantageously, the one of the pair of elements that is located on the frame is located near the end of the anchor which is not connected to the anchor.

Preferably, the sensed relative motion between the pair of elements is used to maintain a predetermined distance between the pair of elements.

A further aspect of the present invention provides a gyroscope comprising two gyroscopes according to the above, adjacent one another such that the respective pairs of elements are adapted to sense motion in collinear directions.

Conveniently, the collinear directions are opposite collinear directions.

In order that the present invention may be more readily understood, embodiments thereof will now be described, by way of example, and with reference to the accompanying drawings, in which.

Figure 1:
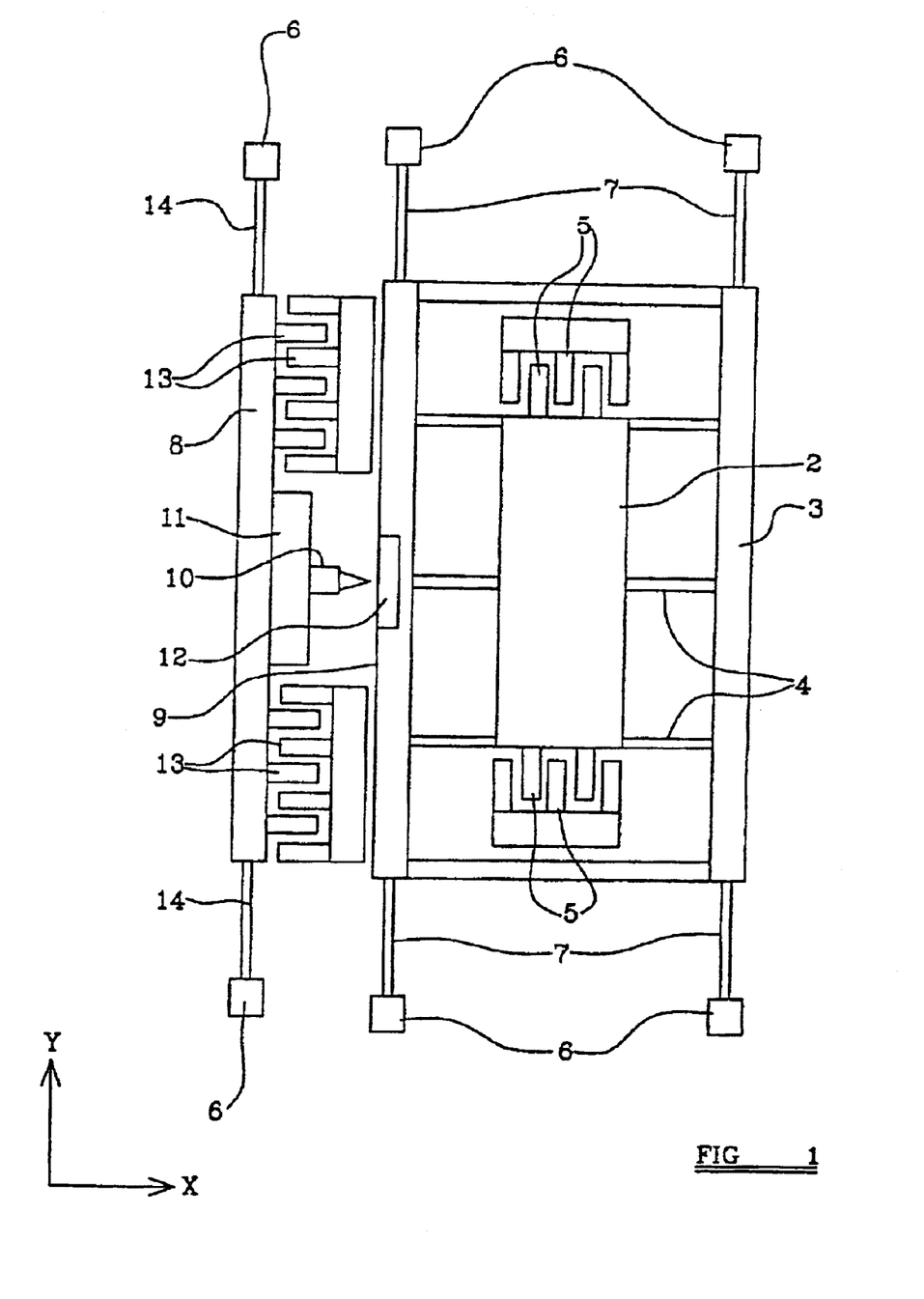
FIGS. 1 to 11 are respective diagrammatic plan views showing first to eleventh quantum tunnelling gyroscopes.

Turning firstly to FIG. 1, a first in-plane vibratory quantum tunnelling gyroscope 1 for use as a constituent of a gyroscope embodying the present invention comprises a proof mass 2, having a substantially rectangular cross-section in the X-Y plane, short sides of the rectangular cross-section lying in an X-direction of the gyroscope 1 and long sides of the rectangular cross-section lying in a Y-direction of the gyroscope 1. A frame 3 substantially surrounds the proof mass 2 in the X-Y plane. The proof mass 2 is connected to the frame 3 by six suspension beams 4, three suspension beams 4 extending in the X-direction from each of the opposing long sides of the proof mass 2 to the frame 3.

It will be appreciated that the use of six suspension beams to connect the proof mass to the frame is not essential to the present invention, and more or fewer suspension beams may be employed.

A pair of electrostatic oscillation actuators 5 are provided on the two short sides of the proof mass 2, the oscillation actuators 5 lying either side of the proof mass 2 in the Y-direction. The frame 3 is connected to an anchor 6, which forms part of a substrate (not shown), by means of four further suspension beams 7, which extend in the Y-direction between the frame 3 and the anchor 6. In a preferred embodiment of the invention, the proof mass 2 is suspended over the substrate. Preferably, the substrate is a silicon substrate.

The suspension beams 4 connecting the proof mass 2 and the frame 3 to one another are formed to have a much larger stiffness in the X-direction than in the Y-direction. In contrast, the further suspension beams 7 connecting the frame 3 to the anchor 6 are formed to have a far greater stiffness in the Y-direction than in the X-direction. In addition, the stiffness of the further suspension beams 7 in the Y-direction is much larger than that of the suspension beams 4 in the Y-direction.

The suspension beams 4 and further suspension beams 7 may be of any appropriate construction (for instance, crab-crab or folded beam), and of any appropriate dimensions, to give rise to the requisite stiffnesses in the X- and Y-directions.

A micropositioner 8 is located adjacent an outer wall 9 of the frame 3 in the X-direction and extends in the Y-direction. A tunnelling tip 10 projects from a surface 11 of the micropositioner 8, the tunnelling tip 10 facing towards the outer wall 9 of the frame 3. A region of the outer wall 9 of the frame 3 immediately adjacent the tunnelling sensing tip 10 carries an electrode 12.

Positioning actuators 13 on the outer wall 9 of the frame 3 and on the micropositioner 8 co-operate to accurately vary the distance between the micropositioner 8 and the frame 3. The micropositioner 8 is connected to the anchor 6 by two connectors 14, which extend between the micropositioner 8 and the anchor 6 in the Y-direction. Preferably, the connectors comprise springs.

In operation of the first gyroscope 1, varying voltages are applied to the electrostatic actuators 5 in such a way as to produce oscillations of the proof mass 2 in the Y-direction. Due to the low stiffness of the suspension beams 4 in the Y-direction, the oscillatory motion of the proof mass 2 is transmitted to the frame 3 to only a very small extent, or not at all. The high stiffness of the springs 7 in the Y-direction further reduces the likelihood of movement of the frame 3 in the Y-direction due to the oscillation of the proof mass 2.

Due to the fact that the frame 3 moves only very slightly or not at all in the Y-direction during oscillation of the proof mass 2, the difficulties discussed above with relation to maintaining a suitably small distance between the sensing tip 10 and the electrode 12 are not encountered. The sensing tip 10 may be positioned within a few nanometers of the electrode 12 on the outer wall 9 of the frame 3 and a steady tunnelling current between these two components may be established without movement of the frame 3, and therefore the electrode 12, in the Y-direction causing damage to the tunnelling tip 10 or a loss of the tunnelling current due to excessive distance therebetween.

In use, the first gyroscope 1 is rotated about a Z-axis thereof, which is perpendicular to both the X- and Y-axes (in FIG. 1, the Z-axis is perpendicular to the plane of the paper). As discussed above, the Coriolis effect causes the proof mass 2 to be deflected, during the oscillation thereof in the Y-direction, in a direction that is perpendicular to both the direction of oscillation and the axis of rotation—namely the X-axis of the first gyroscope 1. Hence, the rotation of the gyroscope 1 about the Z-axis thereof causes the proof mass 2 to perform elliptical oscillatory motion, comprising the driven oscillations in the Y-direction and a relatively small deflection in the X-axis. The deflection of the proof mass 2 in the X-direction is proportional to the rate of rotation of the gyroscope 1, and it is this quantity that must be sensed in order to provide a measurement of the rate of rotation.

Due to the stiffness of the suspension beams 4 in the X-direction, deflection of the proof mass 2 in the X-direction is readily transmitted to the frame 3. Hence, the deflection of the proof mass 2 in the X-direction due to the Coriolis effect causes the frame 3 to move towards, or away from, the micropositioner 8 and hence the tunnelling tip 10 mounted thereon. The variation in distance between the tunnelling tip 10 and the electrode 12 produces, as discussed above, a change in the magnitude of the tunnelling current passing therebetween, and allows measurement of the deflection of the proof mass 2, and hence of the rate of rotation of the first gyroscope 1. Because of the great sensitivity of the tunnelling current to the displacement between the tunnelling tip 10 and the electrode 12, very small displacements of the proof mass 2 during oscillation thereof may be detected and high resolutions can be achieved using gyroscopes embodying the present invention.

A feedback loop (not shown) is provided between the tunnelling tip 10 and electrode 12 and the positioning actuators 13. If, for instance, the frame 3 is deflected towards the micropositioner 8 during oscillation of the proof mass 2, the tunnelling tip 10 and the electrode 12 will be brought closer to one another, and the magnitude of the tunnelling current passing therebetween will increase. This increase in tunnelling current causes the positioning actuators to move the micropositioner 8 away from the frame 3 in order to maintain a constant distance between the tunnelling tip 10 and the electrode 12. Alternatively, if the frame 3 is deflected away from the micropositioner 8 during oscillation of the proof mass 2, the electrode 12 will move further away from the tunnelling tip 10, leading to a drop in the magnitude of the tunnelling current. This drop in current will cause the positioning actuators 13 to move the micropositioner 8 closer to the frame 3, in order to maintain the constant distance between the tunnelling tip 10 and the electrode 12.

Hence, the feedback signal is used for two purposes, namely to control the distance between the tunnelling tip 10 and the electrode 12 (and keep this distance constant) and to provide a measurement of the angular velocity of the gyroscope.

Thus, the de-coupling of the motion of the proof mass 2 in the Y-direction from the frame 3, combined with the ready transmission of the motion of the proof mass 2 to the frame 3 in the X-direction, allows the use of quantum tunnelling sensing techniques with an in-plane vibratory gyroscope.

It will be appreciated that the provision of the tunnelling tip 10 on the micropositioner 8 and the electrode 12 on the frame 3 is simply a design choice, and the gyroscope 1 would function equally well if the tunnelling tip 10 were provided on the frame 3 and the electrode 12 were provided on the micropositioner 8.

Figure 2:
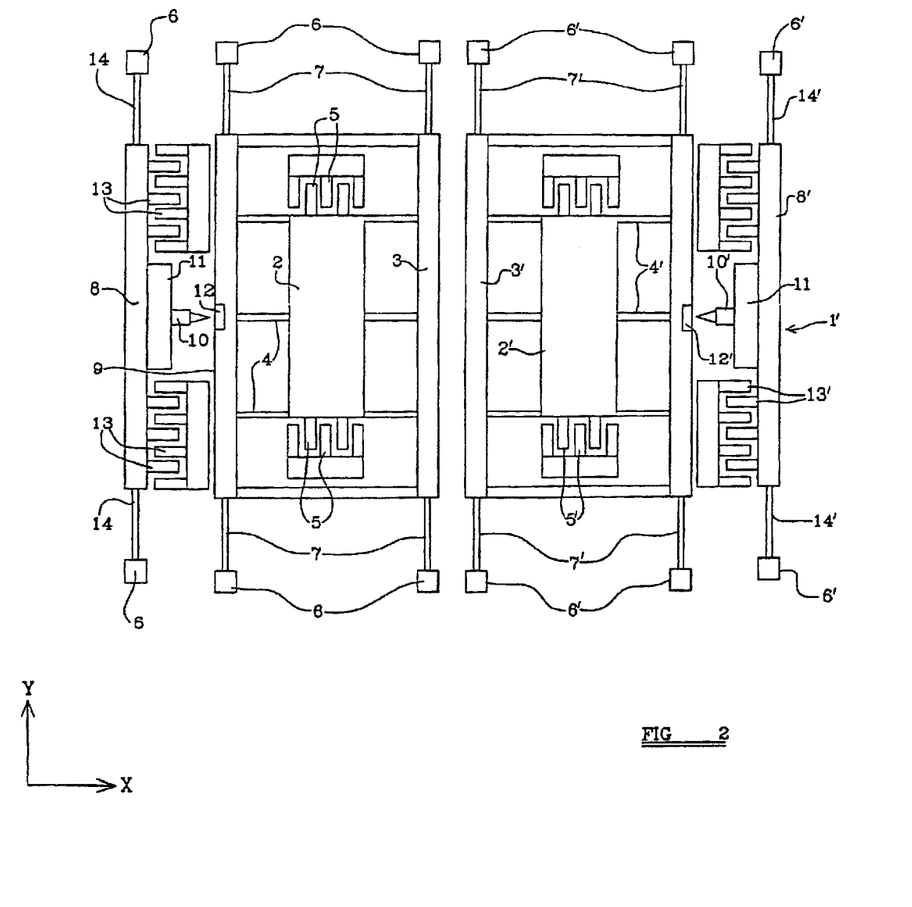

A second gyroscope 15 is shown in FIG. 2 and embodies the present invention. The second gyroscope 15 is a composite gyroscope comprising a pair of juxtaposed constituent gyroscopes, one constituent gyroscope being in the form of the first gyroscope 1 and the other constituent gyroscope 1' being a mirror-image of the first gyroscope 1, reflected in the Y-Z plane. In FIG. 2, components of the mirror-image first gyroscope 1' that correspond to components of the first gyroscope 1 are indicated with primed reference numerals. The first and mirror-image first gyroscopes 1, 1' are aligned so that the frames 3, 3' of the gyroscopes 1, 1' are immediately adjacent one another in the X-direction and lie in the same X-Y plane. In use of the second gyroscope 15, the two proof masses 2, 2' are oscillated in antiphase with one another.

The provision of two proof masses 2, 2' oscillating an antiphase confers two advantages over a gyroscope containing only a single proof mass. Firstly, when the first and mirror-image first gyroscopes 1, 1' are rotated about their common Z-axis, both proof masses 2, 2' will be deflected due to the Coriolis effect. The deflection of the proof mass 2 of the first gyroscope 1 will be detected by the tunnelling sensing tip 10 of the first gyroscope 1, and the deflection of the proof mass 2' of the mirror-image first gyroscope 1' will be detected by the tunnelling sensing tip 10' of the mirror-image first gyroscope 1'. While these deflections will be in opposite directions along the X-axis, the fact that the tunnelling sensing tip 10' of the mirror-image first gyroscope 1' is provided on the opposite side of the frame 3' of the mirror-image first gyroscope 1' from the side of the frame 3 of the first gyroscope 1 adjacent which the tunnelling sensing tip 10 of the first gyroscope 1 is positioned means that the corresponding deflections will give rise to identical variations in the tunnelling currents passing between the two sensing tips 10, 10' and the two electrodes 12, 12'. This is due to the fact that both deflections will tend to move the frames 3, 3' either towards the corresponding tunnelling tips 10, 10' or away therefrom. Hence, this "double measurement" of the deflection due to the Coriolis effect doubles the resolution of the measurement of such deflections by the second gyroscope 15.

A further advantage of providing two gyroscopes 1, 1' adjacent one another is that the resulting composite second gyroscope 15 is resistant to disturbances (for instance, accelerations) of the gyroscope 15 in the X-direction. This is due to the fact that any disturbances in the X-direction that tends to move the frame 3 of the first gyroscope 1 towards the tunnelling sensing tip 10 of the first gyroscope 1 will tend to cause the frame 3' of the mirror-image first gyroscope 1' to move away from the tunnelling sensing tip 10' of the mirror-image first gyroscope 1' by exactly the same distance. Hence, combining the feedback signals from the two tunnelling sensing tips 10, 10' will mean that the two signals resulting from the disturbance of the second gyroscope 15 will cancel one another out, leading to substantially zero overall change in the reading.

It will be clear that the provision of the first and second gyroscopes 1, 1' adjacent one another in the X-direction allows measurements of small deflections with greater resolution, and a high level of insensitivity to externally-induced disturbances in the X-direction. These properties make the resultant second gyroscope 15 particularly suitable to use in conditions where the angular velocity around the Z-axis is very small, or where the gyroscope is Drone to suffer disturbances.

Figure 3:
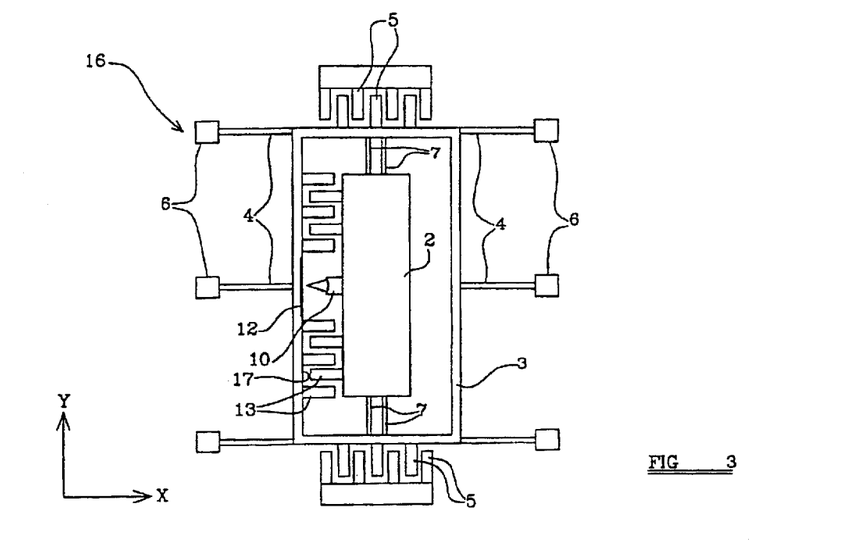

FIG. 3 shows a third gyroscope 16 for use as a constituent of a gyroscope embodying the present invention. Components that the third gyroscope 16 has in common with the first gyroscope 1 are designated by like reference numerals. The third gyroscope 16 comprises a proof mass 2, which is connected to a frame 3. In this configuration, however, the proof mass 2 is connected to the frame 3 by means of further suspension beams 7 extending therebetween in the Y-direction. The further suspension beams 7 are very stiff in the Y-direction, effectively coupling the movement of the proof mass 2 and the frame 3 in the Y-direction. However, the stiffness of the further suspension beams 7 in the X-direction is far smaller than that in the Y-direction, and movement of the proof mass 2 with respect to the frame 3 in the X-direction is relatively unconstrained. The frame 3 is connected to an anchor 6 by means of suspension beams 4 extending in the X-direction, whose stiffness in the X-direction is large, but whose stiffness in the X-direction is small.

Electrostatic positioning actuators 13 are located on an inner wall 17 of the frame 3 and on one side of the proof mass 2, and co-operate with one another to accurately position the proof mass 2 in the X-direction with respect to the frame 3. Electrostatic oscillation actuators 5 are located on the two outer surfaces of the frame 3 that extend in the X-direction, and are operable to cause the frame 3 to oscillate in the Y-direction.

A tunnelling sensing tip 10 projects from a surface of the proof mass 2, facing towards the inner wall 17 of the frame 3 in the X-direction. An electrode 12 is provided on the inner wall 17 of the frame 3 immediately opposite the tunnelling sensing tip 10.

In the use of the third gyroscope 16, the oscillation actuators 5 are operated to cause the frame 3 to oscillate in the Y-direction. Due to the stiffness of the further suspension beams 7 in the Y-direction, this motion is transmitted to the proof mass 2, which also oscillates in the Y-direction. When the third gyroscope 16 is rotated about the Z-axis thereof, the proof mass 2 will suffer a deflection in the X-direction due to the Coriolis effect, as discussed above. The frame 3 will not experience such a deflection, as it is fixed firmly to the anchor 6 in the X-direction by the suspension beams 4.

Hence, as described above with relation to the first gyroscope 1, the deflection of the proof mass 2 in the X-direction will result in variations in the tunnelling current flowing between the tunnelling sensing tip 10 and the electrode 12, which current provides a measurement of the angular velocity of the third gyroscope 16. As describe above, the variations in the tunnelling current are applied to the positioning actuators 13 to maintain an appropriate distance between the tunnelling sensing tip 10 and the electrode 12.

It will be appreciated that, in common with the first gyroscope 1 described above, the de-coupling of the motion of the proof mass 2 with respect to the frame 3 in the X- and Y-directions leads to insensitivity of the third gyroscope 16 to imperfections on the surface of the electrode 12 and provides a very accurate measurement of the deflection of the proof mass 2 in the X-direction, and hence the angular velocity of the third gyroscope 16.

Figure 4:
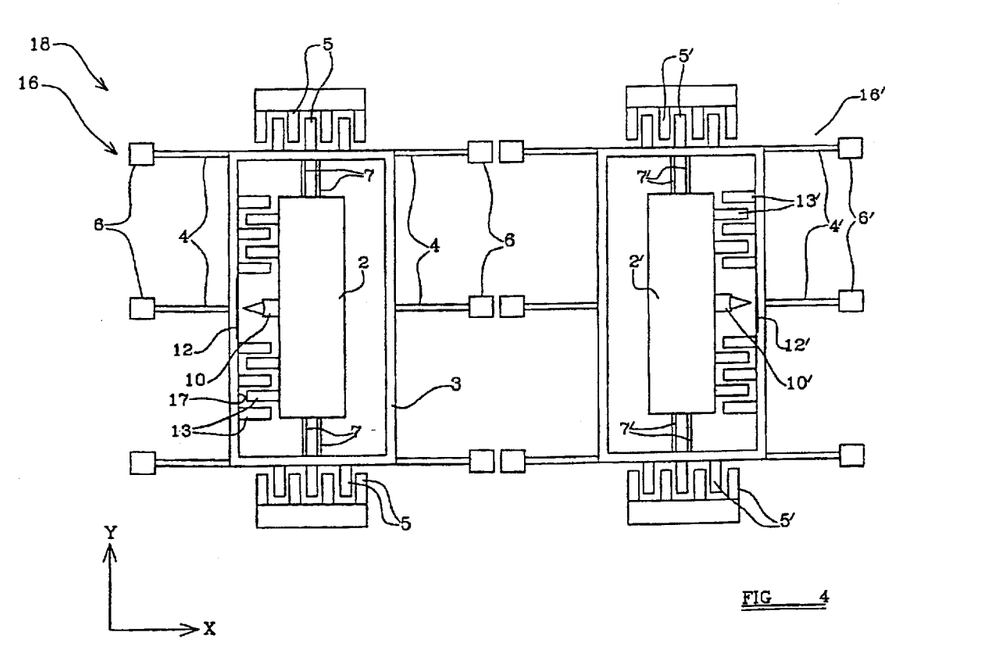

FIG. 4 shows a fourth gyroscope 18, which embodies the present invention and comprises, in a similar manner to the second gyroscope 15, a pair of juxtaposed constituent gyroscopes, one of which is in the form of the third gyroscope 16 and the other of which is identical to the third gyroscope 16 but is a mirror-image thereof, reflected in the Y-Z plane, components corresponding to the third gyroscope 16 being indicated by primed reference numerals. In use of the fourth gyroscope 18, the proof masses 2, 2' are made to oscillate in antiphase with one another, and the above-described benefits with regard to doubled resolution of measurements of deflections arising from the Coriolis effect and insensitivity to external disturbances in the X-direction are conferred by this arrangement.

Figure 5:
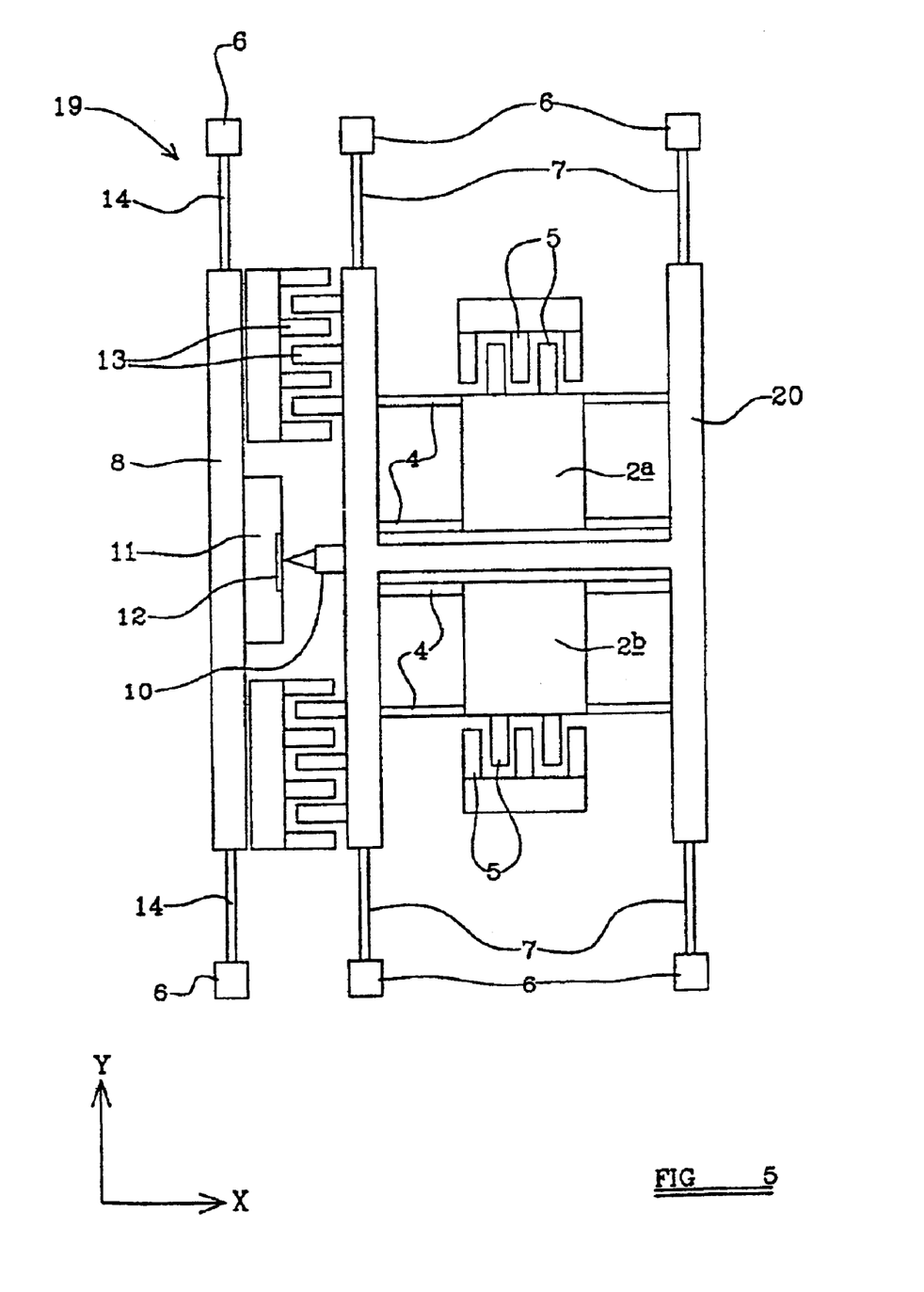

FIG. 5 shows a fifth gyroscope 19 for use as a constituent of a gyroscope embodying the present invention. The fifth gyroscope 19 comprises two proof masses 2A, 2B, attached to an H-shaped frame 20 by means of suspension beams 4 extending in the X-direction therebetween. The two parallel portions of the H-shaped frame 20 extend in the Y-direction and the central bar of the H-shaped frame 20 forms a strut extending between the proof masses 2A, 2B, in the X-direction. The proof masses 2A, 2B are aligned in the Y-direction on either side of the central bar of the H-shaped frame 20. The stiffness of the suspension beams 4 is, in common with the first gyroscope 1, much greater in the X-direction than in the Y-direction. Each proof mass 2A, 2B is provided with an electrostatic oscillation actuator 5, which is operable to cause the respective proof mass 2A, 2B to oscillate in the Y-direction. The remaining components of the fifth gyroscope 19 are identical to those of the first gyroscope 1, with the exception that the positions of the tunnelling tip 10 and the electrode 12 are transposed.

In the use of the fifth gyroscope 19, the oscillation actuators 5 cause the proof masses 2A, 2B to oscillate in the Y-direction, in phase with, but independently of, one another. The deflections of both proof masses 2A, 2B are transmitted to the H-shaped frame 20 by the suspension beams 4, leading to variations in the tunnelling current passing between the tunnelling tip 10 located on an outer surface 9 of the H-shaped frame 20 and the electrode 12 positioned on the micropositioner 8, providing a measurement of the angular velocity of the fifth gyroscope 19 about the Z-axis thereof.

It will be appreciated that the operation of the fifth gyroscope 19 is similar to that of the first gyroscope 1, with two proof masses 2A, 2B being employed instead of single proof mass 2.

Figure 6:
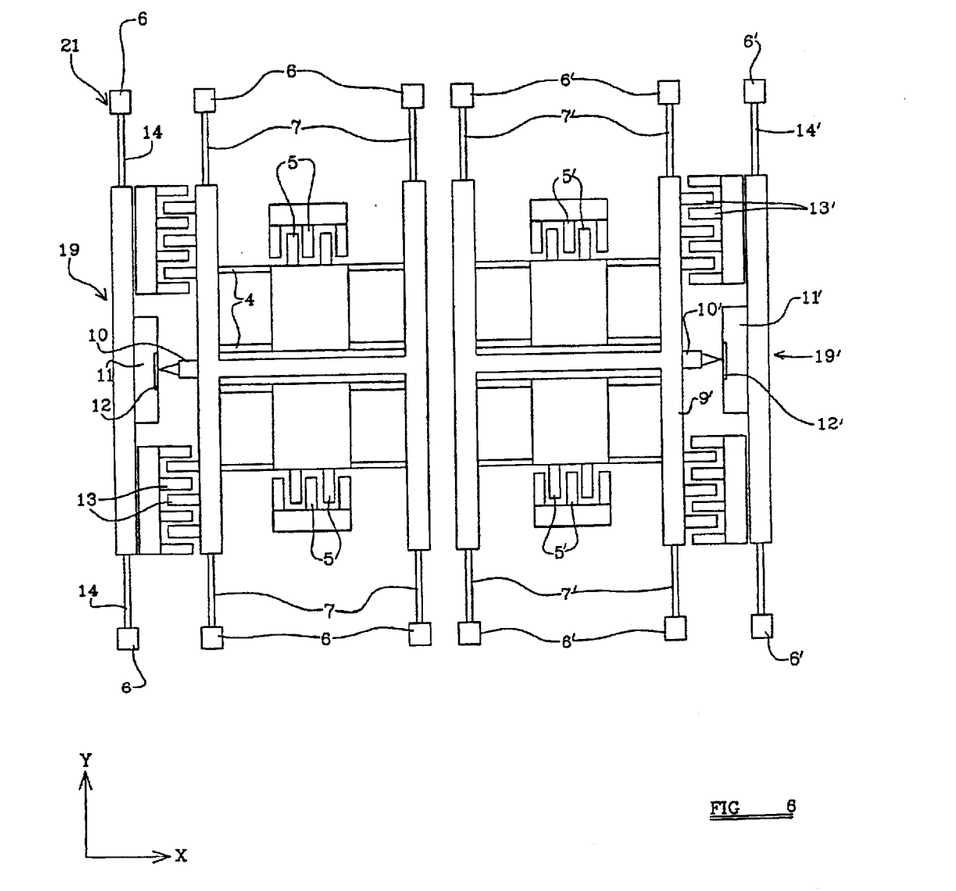

FIG. 6 shows a sixth gyroscope 21, which embodies the present invention. In a similar manner to the second and fourth gyroscopes 15, 18, described above, the sixth gyroscope 21 comprises two juxtaposed constituent gyroscopes, one of which is in the form of the fifth gyroscope 19 and the other of which is identical to, but is a mirror image in the Y-Z plane of, the fifth gyroscope 19. Components of the mirror-image fifth gyroscope 19' that correspond to those of the fifth gyroscope 19 are indicated by primed reference numerals. The fifth and mirror-image fifth gyroscopes 19, 19' are placed adjacent one another in the X-direction. As will be appreciated from the discussion of the second and fourth gyroscopes 15, 18 above, this arrangement leads to an increase in the resolution of the measurement by the sixth gyroscope 21 of angular rotation about the Z-axis thereof, and an insensitivity to extraneous disturbances in the X direction.

Figure 7:
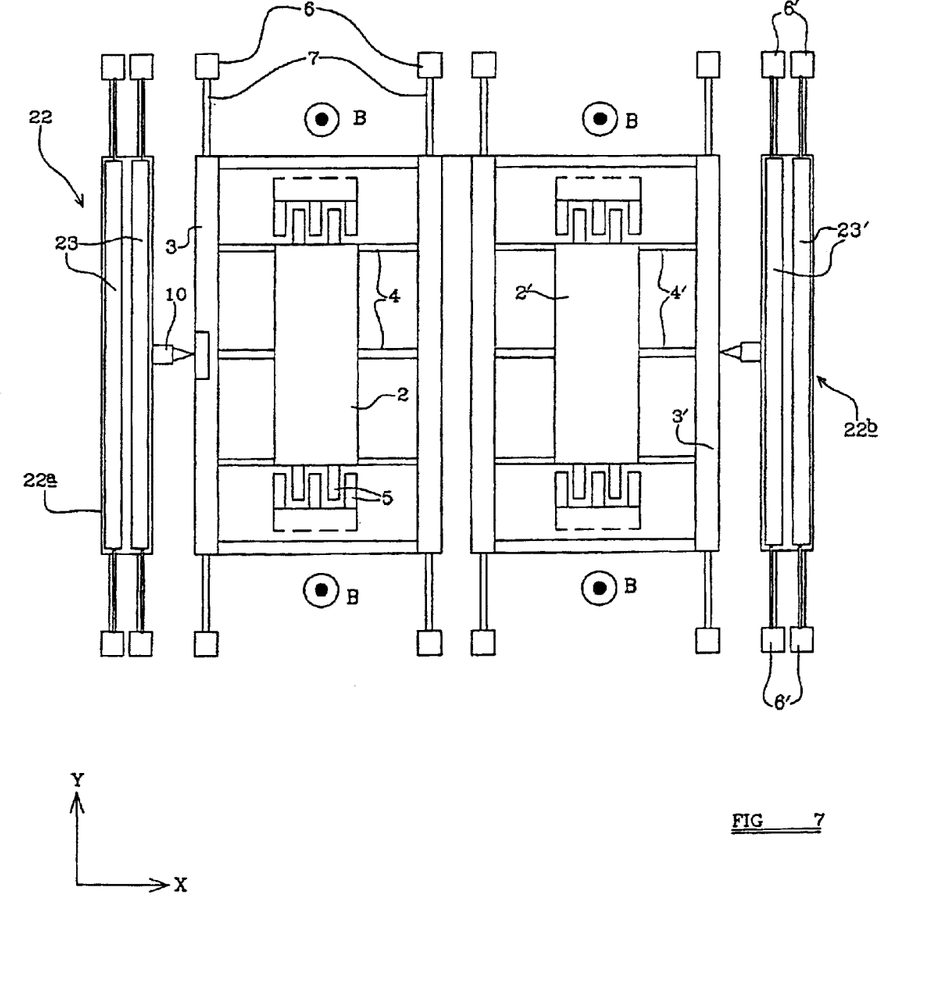

FIG. 7 shows a seventh gyroscope 22, which embodies the present invention. The seventh gyroscope 22 is similar in design to the second gyroscope 15, and comprises two juxtaposed constituent gyroscopes 22A and 22B which are mirror images of one another in the Y-Z plane, adjacent one another in the X-direction. The constituent gyroscopes 22A, 22B that make up the seventh gyroscope 22 are identical to the first and second gyroscopes 1, 1' (elements corresponding to the first and second gyroscopes 1, 1' are labelled with corresponding reference numerals), except that the Lorentz force is used to maintain the appropriate distances between the tunnelling sensing tips 10, 10' and the electrodes 12, 12'. The micropositioners 8, 8' are provided with one or more stripes of a conductive material 23, 23', which may be provided by deposition or evaporation. Alternatively, the stripes may be formed by appropriately doping a silicon substrate within the micropositioners 8, 8'. The stripes of conductive material 23, 23' replace the micropositioning actuators 13, 13'.

A uniform magnetic field is applied to the seventh gyroscope 22 in the Z-direction (perpendicular to the plane of FIG. 7). In one embodiment of the invention, the magnetic field may be provided by the location of a permanently magnetised slab (not shown) on top of, or beneath, the seventh gyroscope 22. By passing currents thorough the stripes of conductive material 23, 23', a Lorentz force in the X-direction arises which may be used to vary the distance between the micropositioners 8, 8' and the frames 3, 3', and hence between the tunnelling tips 10, 10' and the electrodes 12, 12'. The variations in the tunnelling current are, in an analogous way to the control of the micropositioning actuators 13 of the second gyroscope 15, used to control the currents flowing in the stripes of conductive material 23, 23' to maintain the correct distance between the electrodes 12, 12' and the tunnelling tips 10, 10' and to provide a measurement of the angular velocity of the seventh gyroscope 22 around the Z-axis thereof.

Figure 8:
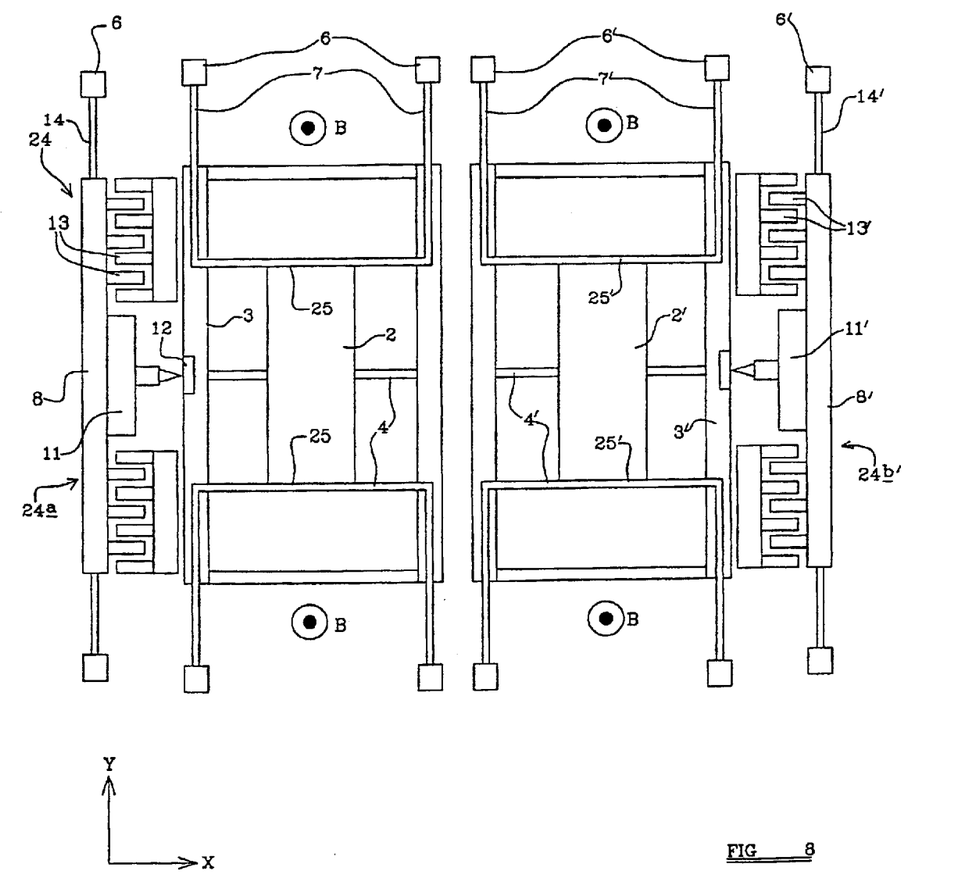

FIG. 8 shows an eighth gyroscope 24, which embodies the present invention and comprises two juxtaposed gyroscopes 24A, 24B which are mirror images of one another in the Y-Z plane and which are adjacent one another in the X-direction. The constituent gyroscopes 24A, 24B that make up the eighth gyroscope 24 are identical to the first and second gyroscopes 1, 1', (corresponding components being indicated by corresponding reference numerals) except that the Lorentz force is used to cause the oscillation of the proof masses 2, 2' in the Y-direction. Stripes of conductive material 25, 25' are deposited on the proof masses 2, 2', orientated in the X-direction. The stripes of conductive material 25, 25' are connected to an AC current supply, which is operable to supply AC current at a frequency equal to the natural oscillation frequency of the proof masses 2, 2'.

In a similar manner to the seventh gyroscope 22, a uniform magnetic field in the Z-direction is applied to the eighth gyroscope 24. Hence, the flow of AC current through the stripes of conductive material 25, 25' on the proof masses 2, 2' causes movement of the proof masses 2, 2' in the Y-direction. Clearly, applying AC current at a frequency equal to the natural frequency of the proof masses 2, 2' leads to oscillation in the Y-direction of the proof masses 2, 2'. In order that the proof masses 2, 2' oscillate in antiphase with one another, the current applied to the stripes of conductive material 25 on the proof mass 2 of one of the constituent gyroscopes 24A that make up the eighth gyroscope 24 is in antiphase with the current applied to the stripes of conductive material 25' on the proof mass 2' of the other of the constituent gyroscopes 24B of the eighth gyroscope 24.

Figure 9:
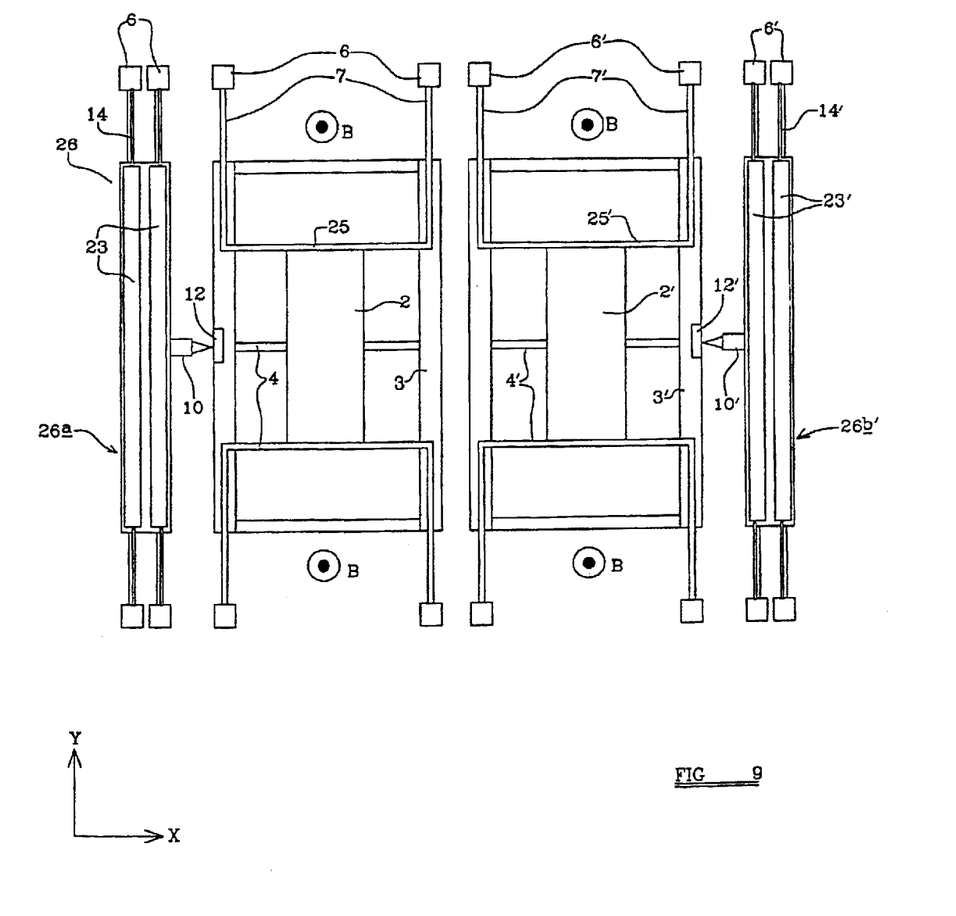

FIG. 9 shows a ninth gyroscope 26, which embodies the present invention. In a similar manner to the seventh and eighth gyroscopes 22, 25, the ninth gyroscope 26 comprises two juxtaposed constituent gyroscopes 26A, 26B, which are mirror-images of one another in the Y-Z plane and which are adjacent one another in the X-direction. The constituent gyroscopes 26A, 26B of the ninth gyroscope 26 are identical to the first and second gyroscopes, 1, 1' (components in common therewith being designated with like reference numerals), except that the Lorentz force is used both for controlling the distance between the tunnelling tips 10, 10' and the electrodes 12, 12' (as described above in relation to the seventh gyroscope 22) and for causing the oscillations of the proof masses 2, 2' in the Y-direction (as described above in relation to the eighth gyroscope 23).

Figure 10:
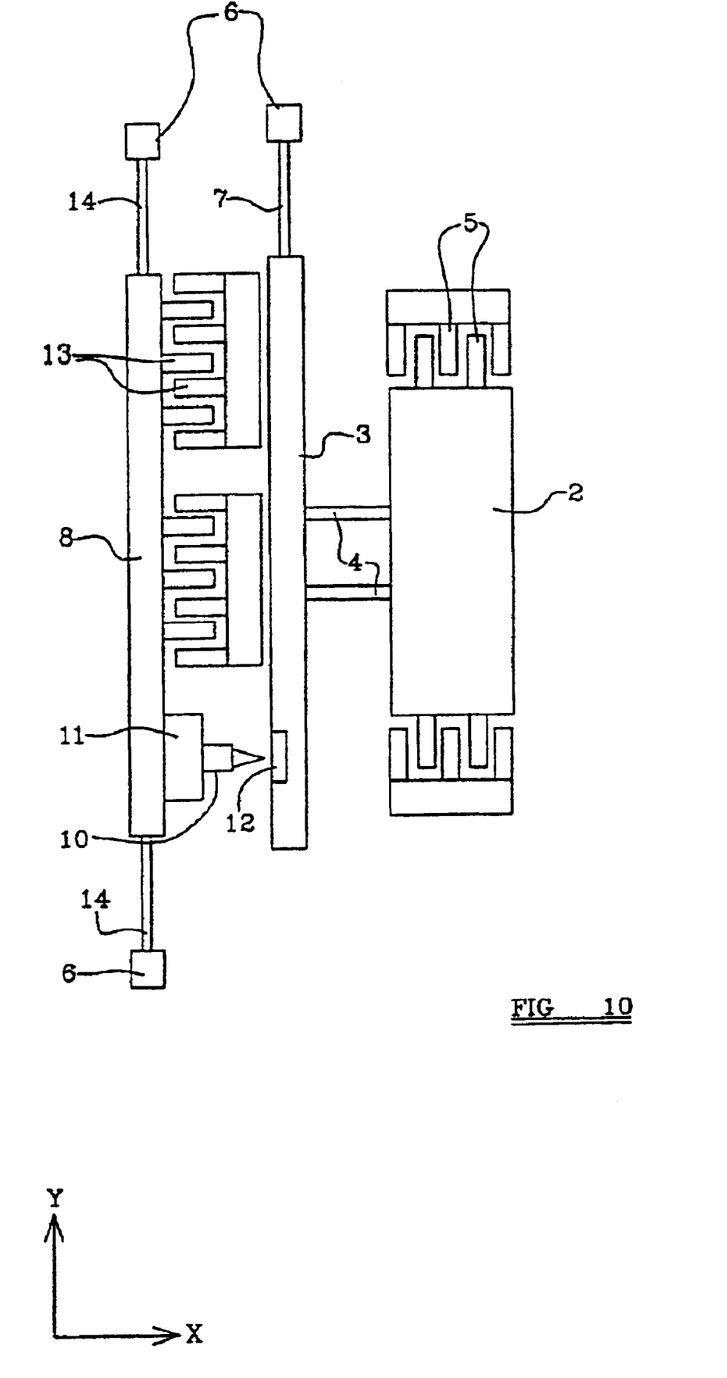

FIG. 10 shows a tenth gyroscope 27, which embodies the present invention. The tenth gyroscope 27 resembles the first gyroscope 1, however, the tenth gyroscope 27 has a frame 3 which, instead of extending all the way around the proof mass 2 in the X-Y plane, is provided only on one side of the proof mass 2, and extends alongside the proof mass 2 in the Y-direction.

A pair of suspension beams 4 extend between the frame 3 and the proof mass 2 in the X-direction, the suspension beams being close to one another and attaching to the proof mass 2 at locations close to the centre of one of the long sides thereof that extend in the Y-direction. As described above in relation to, for example, the first gyroscope, the tenth gyroscope 27 comprises electrostatic oscillation actuators 5 which are operable to cause the proof mass 2 to oscillate in the Y-direction. As described above, electrostatic oscillation actuators 5 are provided and are operable to cause the proof mass 2 to oscillate in the Y-direction. The stiffness of the suspension beams 4 is much greater in the X-direction than that in the Y-direction and so the oscillation induced by the electrostatic oscillation actuators is resisted by the suspension beams 4 to only a very minor extent.

It will be appreciated that, since the proof mass 2 is connected to the frame 3 at only one side thereof, oscillation of the proof mass 2 in the Y-direction will cause the proof mass 2 to describe an arcing trajectory during oscillation. This arcing trajectory will arise as a result of cantilever movement of the suspension beams 4, around their respective points of attachment to the frame 3.

In contrast with the first gyroscope 1, the frame 3 of the tenth gyroscope 27 is connected to the anchor 6 at only one end thereof, the other end of the frame 3 not being connected to the anchor 6. An electrode 12 is provided on an outer surface of the frame 3 near the end thereof that is not connected to the anchor 6. A quantum tunnelling sensing tip is provided on the micropositioner 8, facing the electrode 12.

It will be clear to a person of ordinary skill in the art that, as the proof mass 2 of the tenth gyroscope 27 described an arcing trajectory, the motion of the "free" end of the frame 3 in the first direction (i.e. towards the quantum tunnelling sensing tip) will be amplified by a leverage effect. This effect will increase the amplitude of the variance of the tunnelling current passing between the tunnelling sensing tip and the electrode, and will therefore increase the resolution of the tenth gyroscope 27, allowing the tenth gyroscope 27 to detect lower angular velocities thereof.

In this embodiment of the present invention, the electrode 12 is provided on the outer wall 9 of the frame 3 near the free end thereof. The quantum tunnelling tip 10 is provided on the micropositioner 8, opposite the electrode. The provision of the electrode 12 near the free end of the frame 3 ensures that the extra movement of the free end of the frame is exploited to detect deflection of the proof mass 2 arising from the Coriolis effect.

Figure 11:
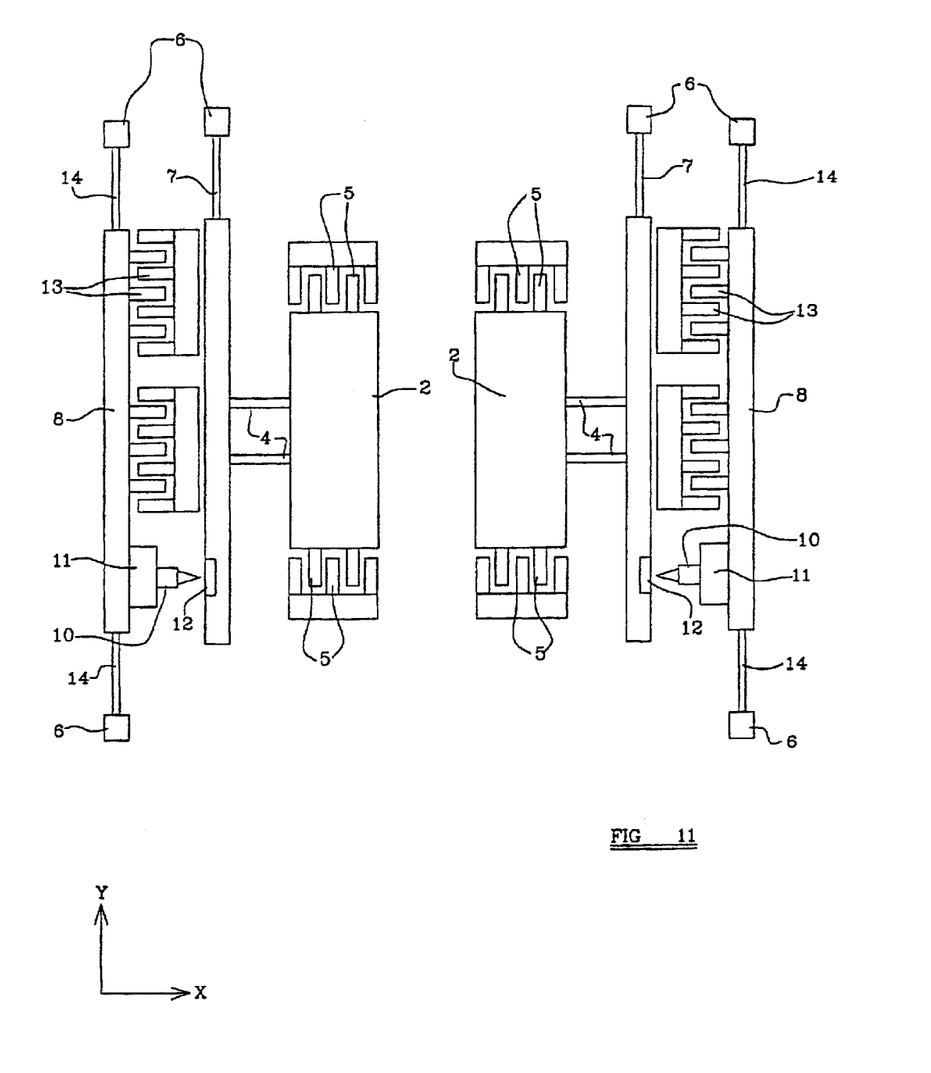

FIG. 11 shows an eleventh gyroscope, which embodies the present invention and comprises two constituent gyroscopes, one of which is in the form of the tenth gyroscope 27 and the other of which 27' is a mirror-image of the tenth gyroscope 27, reflected in the Y-Z plane. It will be clear to a person of ordinary skill in the art, from the above discussion, that the provision of two constituent gyroscopes confers significant advantages with regard to resolution and insensitivity to extraneous deflections. In FIG. 11, the components of the constituent gyroscope 27' that is a mirror image of the tenth gyroscope 27 are indicated by primed reference numerals.

It will be appreciated that, as described above, the present invention provides a gyroscope that is able to measure with a very high degree of precision the rate of rotation around the Z-axis thereof, and which measurement is insensitive to disturbances of the gyroscope in the X-direction.

Although only three types of frame have been described above, namely frames that surround the proof mass, H-shaped frames comprising a strut that extends between two proof masses and frames that extend along only one side of the proof mass, it will be immediately obvious to a person of ordinary skill in the art that the present invention is not limited to such frames. Indeed, it will be appreciated that any design of frame that adequately supports the proof mass and allows detection of reflections thereof due to the Coriolis effect may be employed in embodiments of the present invention.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A gyroscope comprising a pair of constituent gyroscopes, each of the constituent gyroscopes comprising:
    a proof mass;
    a frame supporting the proof mass;
    a connection arrangement connecting the proof mass and the frame,
    the connection arrangement having a first stiffness in a first direction and a second stiffness in a second direction substantially perpendicular to the first direction, one of the stiffnesses being significantly greater than the other stiffness; and
    a pair of elements, one of which is a quantum tunnelling sensing tip, adapted to sense motion therebetween in either the first or the second direction.

2. A gyroscope according to claim 1, wherein means are provided on each of the constituent gyroscopes to cause the respective proof masses to oscillate in either the first or the second direction, the pairs of elements being adapted to sense motion in the other of the first or the second direction.

3. A gyroscope according to claim 1, wherein the means to cause the respective proof masses to oscillate are operable to cause the respective proof masses to oscillate in antiphase with one another.

4. A gyroscope according to claim 2, wherein at least one of the means to cause the proof masses to oscillate comprises at least one electrostatic oscillation actuator.

5. A gyroscope according to claim 2, wherein at least one of the means to cause the proof masses to oscillate comprises at least one current-carrying element orientated in the other of the first or the second direction, a magnetic field being provided in a direction perpendicular to the first and second directions.

6. A gyroscope according to claim 1, wherein at least one of the connection arrangements comprises at least one suspension beam extending between the proof mass and the frame.

7. A gyroscope according to claim 1, wherein at least one of the constituent gyroscopes comprises an anchor, the frame of the constituent gyroscope being connected to the anchor.

8. A gyroscope according to claim 7, further comprising a positioner located adjacent the frame of the at least one constituent gyroscope, the positioner being connected to the anchor.

9. A gyroscope according to claim 8, wherein the positioner is connected to the anchor by at least one spring.

10. A gyroscope according to claim 8, further comprising means to vary the distance between the positioner and the frame.

11. A gyroscope according to claim 10, wherein the means to vary the distance between the positioner and the frame comprise at least one electrostatic positioning actuator.

12. A gyroscope according to claim 10, wherein the means to vary the distance between the positioner and the frame comprise at least one current-carrying element.

13. A gyroscope according to claim 1, wherein one of at least one of the pairs of elements is located on the frame of the respective constituent gyroscope, the other of the at least one of the pairs of elements being located on the proof mass of the respective constituent gyroscope.

14. A gyroscope according to claim 8, wherein one of the pair of elements on the at least one constituent gyroscope is located on the positioner, the other of the pair of elements being located on the frame of the at least one constituent gyroscope.

15. A gyroscope according to claim 1, wherein at least one of the constituent gyroscopes comprises a further proof mass.

16. A gyroscope according to claim 15, wherein the at least one constituent gyroscope comprising a further proof mass further comprises a strut passing between the proof mass and the further proof mass of the respective constituent gyroscope.

17. A gyroscope according to claim 1, wherein the sensed relative motion between each of the pairs of elements is used to maintain a predetermined distance between the elements of each pair of elements.

18. A gyroscope according to claim 1, wherein the respective pairs of elements are adapted to sense motion in collinear directions.

19. A gyroscope comprising:
    a proof mass;
    a frame supporting the proof mass and connected to only one edge thereof by a connection arrangement extending between the proof mass and the frame in a first direction, the connection arrangement having a first stiffness in the first direction and a second stiffness in a second direction substantially perpendicular to the first direction, the first stiffness being significantly greater than the second stiffness;
    a positioner located adjacent the frame; and
    a pair of elements adapted to sense relative motion therebetween in the first direction.

20. A gyroscope according to claim 19, further comprising means to cause the proof mass to oscillate in the second direction.

21. A gyroscope according to claim 20, wherein the means to cause the proof masses to oscillate comprise at least one electrostatic oscillation actuator.

22. A gyroscope according to claim 20, wherein the means to cause the proof masses to oscillate comprise at least one current carrying element oriented in the first direction.

23. A gyroscope according to claim 20, wherein the frame and the proof mass are connected to one another by the connection arrangement such that, during oscillation of the proof mass in the second direction, the proof mass suffers an angular deflection with respect to the frame.

24. A gyroscope according to claim 23, wherein the proof mass suffers the angular deflection as a result of a cantilever effect.

25. A gyroscope comprising:

a proof mass;

a frame supporting the proof mass and connected to only one edge thereof by a connection arrangement extending between the proof mass and the frame in a first direction, the connection arrangement having a first stiffness in the first direction and a second stiffness in a second direction substantially perpendicular to the first direction, the first stiffness being significantly greater than the second stiffness; and a pair of elements adapted to sense relative motion therebetween in the first direction, wherein one of the pair of elements comprises a quantum tunnelling sensing tip, the other of the pair of elements comprising an electrode.

26. A gyroscope according to claim 25, further comprising a positioner located adjacent the frame.

27. A gyroscope according to claim 26, further comprising an anchor, the positioner and the frame being connected to the anchor.

28. A gyroscope according to claim 27, wherein the positioner is connected to the anchor by at least one spring.

29. A gyroscope according to claim 27, wherein means are provided to vary the distance between the positioner and the frame.

30. A gyroscope according to claim 29, wherein the means to vary the distance between the positioner and the frame comprise at least one electrostatic positioning actuator.

31. A gyroscope according to claim 29, wherein the means to vary the distance between the positioner and the frame comprise at least one current-carrying element oriented in the second direction, a magnetic field being provided in a direction perpendicular to the first and second directions.

32. A gyroscope according to claim 26, wherein one of the pairs of elements is located on the positioner, the other of the pair of elements being located on the frame.

33. A gyroscope according to claim 19, wherein one of the pair of elements is located on the frame, the other of the pair of elements being located on the proof mass.

34. A gyroscope according to claim 33, further comprising an anchor, the frame being connected to the anchor.

35. A gyroscope according to claim 34, wherein the frame is connected to the anchor at only one end thereof.

36. A gyroscope according to claim 29, wherein the one of the pair of elements that is located on the frame is located near the end of the anchor which is not connected to the anchor.

37. A gyroscope according to claim 19, wherein the sensed relative motion between the pair of elements is used to maintain a predetermined distance between the pair of elements.

38. A gyroscope comprising two gyroscopes according to claim 19, adjacent one another such that the respective pairs of elements are adapted to sense motion in collinear directions.

39. A gyroscope according to claim 38, wherein the collinear directions are opposite collinear directions.

40. A gyroscope according to claim 25, further comprising means to cause the proof mass to oscillate in the second direction.

41. A gyroscope according to claim 40, wherein the means to cause the proof masses to oscillate comprise at least one electrostatic oscillation actuator.

* * * * *